Patented May 26, 1936

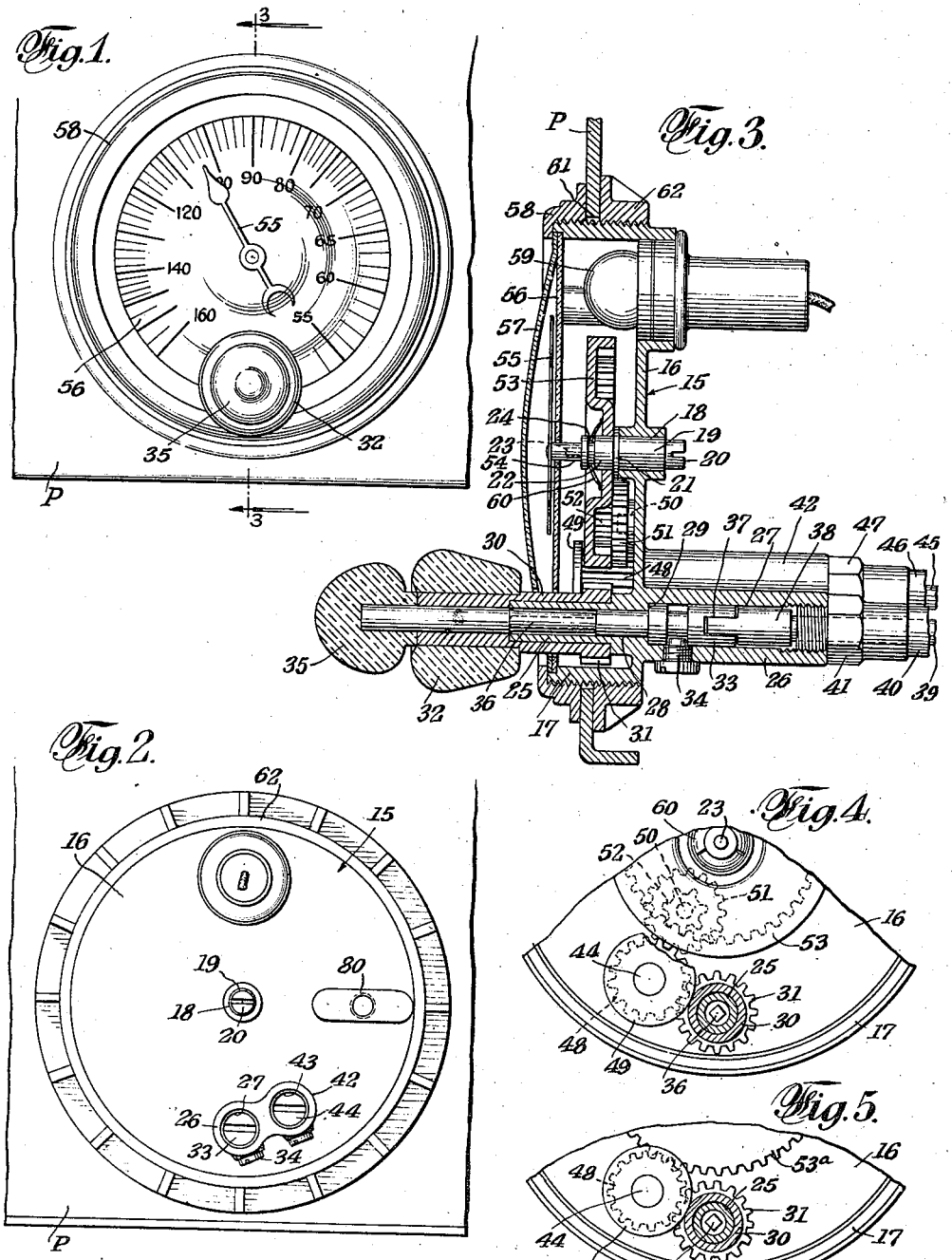

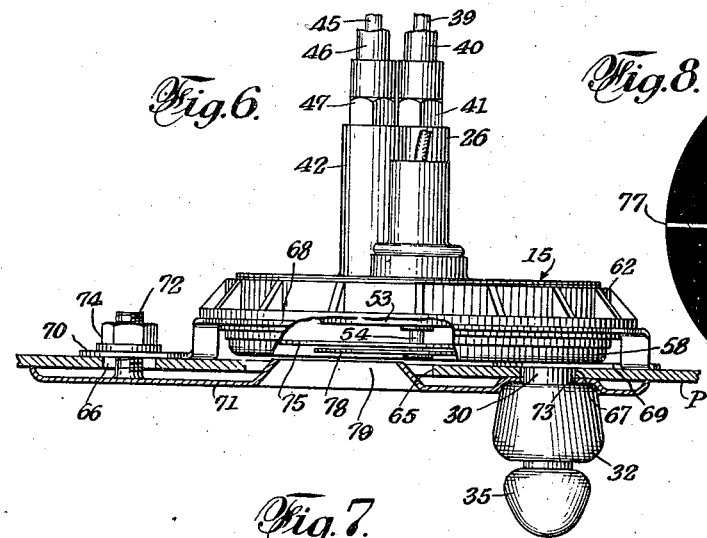
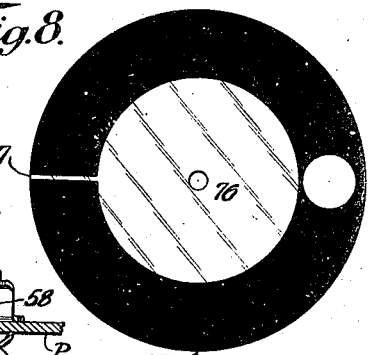
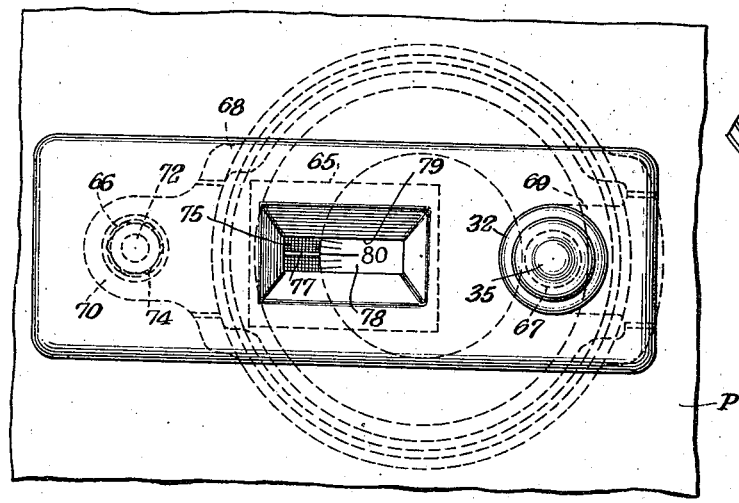
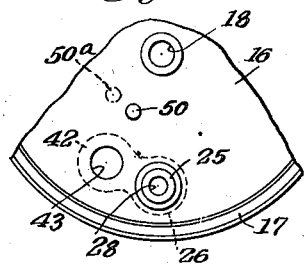
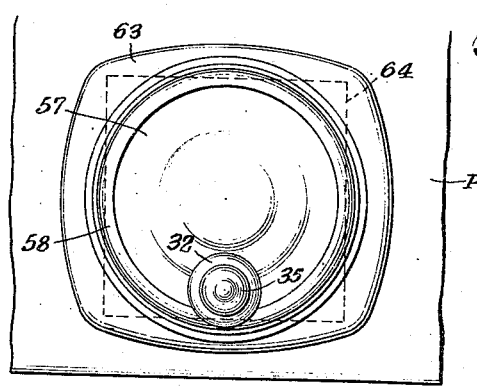

2,042,061

UNITED STATES PATENT OFFICE 2,042,061

RADIO CONTROL HEAD

Nathan A. Karlin, Brooklyn, N. Y., assignor to Kay Products of America, Brooklyn, N. Y., a corporation of New York Application May 9, 1935, Serial No. 20,637

11 Claims. (Cl. 116—124.1)

The present invention relates to improvements in devices for the remote control of radio receiving apparatus particularly as applied to automobiles or the like.

Heretofore it has been the common practice to mount a radio receiver upon some out of the way portion of an automobile such as the dash board and to operate and control said receiver from a device mounted upon the steering column of said automobile. The present tendency is to mount said control device on the instrument panel of said automobile where it is also accessible to a person sitting beside the driver. The driving connections in this type of installation are also shorter and therefore more positive in their operation and less expensive.

The trend among automobile manufacturers to-day is to provide certain openings in the instrument panel adapted to receive such a device, and if the automobile is sold without a radio to cover said openings with dummy plates or to install in them appliances such as ash receivers or the like.

Each manufacturer of automobiles contemplates the use of a particular form or design of tuning device, and therefore the mentioned openings in the various automobiles all differ from each other to such a degree as to obviate the interchangeable use of tuning devices and therefore not granting the owner of the automobile the selection of one radio receiver in preference to another.

Some of these openings in the instrument panel are round, some are square and some are smaller rectangular openings flanked by two round openings, each being provided for the reception of a particular form of tuning device.

The generally broad object of the invention is to provide a radio tuning device having means rendering it adaptable for mounting upon any instrument panel as designed at the present time, and thereby providing a tuning head which is universal in its use.

Another important object of the invention is to provide a neat, compact tuning head, which is adapted, by means of change gearing and interchangeable dials and dial hands, to be universally used in association with any automobile radio as at the present manufactured.

Another object of the invention is to provide a tuning head of substantially circular form in which the receiver condenser tuning knob and the receiver potentiometer and switch key are arranged coaxially and within the periphery of the tuning head to provide a more compact device than has hitherto been constructed.

A still further object of the invention resides in the provision of special adapters selectively employed for mounting a circular tuning head upon the instrument panel of any automobile as to-day manufactured.

The foregoing objects and others later apparent are realized in the invention as exemplified in the accompanying drawings and hereinafter described.

In the drawings:

Figure 1 is a front view of a tuning head as applied to an instrument panel provided with a circular opening for the mounting thereof.

Figure 2 is a rear view thereof.

Figure 3 is an enlarged vertical sectional view as taken along the line 3—3 of Figure 1.

Figures 4 and 5 are fragmentary detail views showing different gearing connections between the condenser tuning knob and the dial or dial hand of a tuning head.

Figure 6 is a plan view partly broken away and partly in section of the tuning head shown in Figures 1, 2, and 3 provided with means adapting it for mounting upon an instrument panel provided with a rectangular opening flanked by two smaller circular openings.

Figure 7 is a front view thereof.

Figure 8 is a rear view of an index plate as employed in the head as applied in Figures 6 and 7.

Figure 9 is a front view showing the manner of mounting the previously described tuning head upon an instrument panel which is provided with a large square opening.

Figure 10 is a fragmentary detail view, illustrating the method of providing the tuning head housing with a trunnion suitable for the change gearing to be employed therein.

With special reference to Figures 1 to 4 the head comprises a circular housing 15 having a rear wall 16 and an externally threaded peripheral wall 17. As at present contemplated this housing is preferably formed as a die casting to provide a light, strong member requiring a minimum of machining and finishing.

At its center, the wall 16 is provided with a seat 18 in which is journalled a shaft 19. This shaft is provided with a slotted rear extension 20 and an enlarged collar-like portion 21 engaged against the inner face of a boss surrounding the seat 18, with a gear mounting hub 22 and with a dial or dial hand pilot 23. The shaft is also provided with a grooved portion 24 between the hub 22 and the pilot 23.

Within the confines of the peripheral wall 17 and adjacent thereto, the housing is provided with a boss 25 projecting somewhat beyond the wall 17 and with another boss 26 coaxial therewith projecting to the rear of the housing. The two bosses 25 and 26 are preferably provided with a through passage 27 reduced in size as at 28 and shouldered at 29.

Upon the hub 25 there is preferably mounted a sleeve 30 provided with a drive gear 31 at one end and with a knob 32 at the other.

Within the opening 27 there is positioned an insert 33 held against endwise movement by means of the screw 34 and adapted to be rotated by the knob 35, coupled with the insert as by the separable connection shown at 36. The insert is preferably bifurcated at 37 to receive a tongue portion on a coupling 38 connected to a flexible drive shaft 39. As is usual this shaft 39 is arranged within a flexible tubular housing 40 rigidly held in relation to the boss 26 by means of the nut 41.

Adjacent the boss 26 and preferably formed integrally therewith is another similar boss 42 also provided with a passage 43 in which is positioned a slotted insert 44, coupled as previously described to the flexible shaft 45, housed in a flexible tube 46 and retained in relation to the hub 42 by means such as the nut 47.

Upon the insert 44 there is preferably fixed an idler gear 48 of the same size as the gear 31 and meshing therewith. The gear 48 is provided with a flange 49 as shown.

The wall 16 of the housing 15 is provided with an integrally formed trunnion 50 and upon this trunnion there is mounted a pair of gears, the larger of which 51 meshes with the gear 48 and the smaller 52 meshes with an internal gear 53 mounted upon the shaft 19.

The pilot 23 of the shaft 19 is designed to support a hub 54 of a dial hand 55. The hub 54 protrudes thru a central opening in a graduated dial 56 which together with the crystal 57 is clamped into position across the open front portion of the housing 15 by means of a ring 58 having threaded engagement with the screw threads on the peripheral wall 17 of the housing. The dial 56 and the crystal 57 are provided with aligned openings thru which protrudes the sleeve 30. This provides a tuning head having a dial of the "aeroplane" type so much in vogue at the present time.

The dial 56 is preferably formed of a thin translucent material, and mounted in the housing 15 and positioned so as to illuminate the rear face of the dial there is provided an electric lamp 59, the switch of which, as is the usual practice, is controlled by the knob 35.

When it is desired to operate the radio receiver, the switch key 35 is turned and thru its connection at 36 with the insert 33 the coupling 38 is turned to rotate the flexible connection 39. This operates the receiver switch and light switch simultaneously. Also, as is the practice to-day, the shaft 39 operates a potentiometer or a similar device in the receiver for clarifying the reception and for obtaining the desirable volume of sound.

Manipulation of the knob 32, thru its gear 31, rotates by means of the gear 48, the flexible connection 45 connected with the tuning condenser of the receiver, and the gearing 51, 52, and 53 are employed to position the dial hand 55 in relation to the graduations of the dial 56 commensurate with the position of the movable plates of the tuning condenser.

In order to initially locate the dial hand so as to have proper relation with the variable plates of the tuning condenser, the internal gear 53 is loosely mounted on its hub 42 and frictionally held thereon by means of the spring washer 60, the slotted end 20 of the shaft 19 being employed for this dial hand setting operation.

The device as described is specifically designed for use with a radio receiver having a certain type of condenser, the dial graduations being designed for proper relation therewith. However, these condensers vary and for this reason the head as heretofore described could not be interchangeably used with various receivers. Hence, the invention contemplates that the change gears 51 and 52 may be varied in their proportion to each other and to the idler gear 48 so as to attain a proper rotational relation between the dial hand 55 and that tuning condenser which is employed.

In order to accomplish this it is necessary to make provision for mounting the change gears so the larger is properly in mesh with the idler gear 48 and the smaller is properly in mesh with the internal gear 53. While means such as a plug having an eccentric pin or trunnion carried by the housing 16 may be employed for the purpose it is believed that a better manner of accomplishing this is to provide the dies in which the housing is cast with pre-settable means whereby the trunnion 50 is integrally formed in the housing 15 at the exact position for properly mounting the change gears 51 and 52. This novel feature is best shown in Figure 10 where the trunnion at 50 is positioned for the reception of the change gears shown in Figure 4, and where the trunnion at 50a is positioned for such other change gears as would be suitable. It is therefore a simple matter, without necessitating change of dies, to supply a housing having the change gear trunnion positioned according to specifications.

With certain forms of tuning condensers the change gearing 51 and 52 may be entirely eliminated and instead of the internal gear 53 a spur gear 53a may be employed for direct mesh with the idler gear 48. In this event the housing 15 may be cast without the trunnion previously mentioned.

From the foregoing it can be seen that by the simple interchangeability of gearing one housing may be employed to meet all possible contingencies.

The tuning head as above described is not only universal in its structure as related to various receivers but is also universally adapted for mounting upon the instrument panel of an automobile. Where such a panel shown at P is provided with a circular opening such as 61, the tuning head is merely passed thru said opening from the front and a retainer nut 62 engaged on the threads of the wall 17 from the rear to surely and non-displaceably secure the head on the panel. This is best shown in Figure 3.

Where the panel P is provided with a square opening (Figure 9) the head is applied in a similar manner but between the panel and the ring 58 there is positioned an escutcheon plate 63 to conceal portions of the openings 64 which would not otherwise be covered by the ring 58.

In the form of mounting shown in Figures 6 and 7, the panel P is provided with a somewhat smaller rectangular opening 65 flanked by two round openings 66 and 67. These openings are much too small for the protrusion of the tuning head as here contemplated and for the purpose of mounting said head on a panel provided with the mentioned openings there is preferably employed an adapter ring 68 which is clamped between the ring 58 and the retainer nut 62 and provided with an offset portion 69 having an opening in alignment with the hole 67 and thru which the sleeve 30 protrudes, and another offset portion 70 also having an opening in alignment with the panel hole 66. The outer faces of both offset portions 69 and 70 are adapted to be positioned against the inner surface of the panel P and an escutcheon plate 71 provided with a screw stud 72 is preferably placed over the front surface of the panel with the mentioned stud projecting thru the opening 67 and the opening in the offset portion 70.

In register with the opening 67 and for accommodation of the sleeve 30, this escutcheon plate is also provided with an opening 73. Now by the mere application of a proper nut and washer 74 on the stud 72 the tuning head and its adapter plate and the escutcheon plate 71 are properly secured and mounted upon the panel P.

In this type of installation the "aeroplane" type of dial is not applicable and therefore, the tuning head is provided with an index plate 75 which displaces the dial plate 56 and which is provided with a central translucent area 76 and a translucent index line 77, the remaining surface of the plate being treated to make it opaque. Associated with this index plate 76, and replacing the dial hand 55, there is employed a graduated disc 78 mounted on the pilot 23 in exactly the same manner as the dial hand 55. As can be seen from Figure 7 the graduations of the disc 78 may be read in association with the index line 77 thru the opening 79 in the escutcheon plate 71.

It will be noted also that this form of mounting provides a neatly appearing panel in which no portions of the tuning head are visible except the graduations associated with the index line and the control knobs 32 and 35.

To further provide the tuning head with the universal properties contemplated in this invention, the rear wall 16 of the housing 15 is provided with means such as shown at 80, which, by means of clamps or straps (not shown) render this tuning head adaptable for mounting upon the steering column of an automobile. Since some automobiles at present in use are not designed to accommodate a tuning head on their instrument panel, this additional feature is quite desirable.

It should be apparent from the foregoing that the invention seeks not only to provide a novel and improved type of tuning head but strives to provide one which may have universal application, permitting the owner of an automobile to choose for his use the radio receiver which he believes best suited for his purpose, giving him in that way a flexible choice commensurate with his desires as to quality and price.

While the foregoing specification is greatly detailed, it is believed that the invention in its novel aspects should not be limited to the present specific disclosure, since immaterial changes in construction and in the proportion and the sizes of the parts may well be made without departing from the scope of the invention as hereinafter claimed.

What I claim as new, and desire to secure by Letters Patent is:

1. A device of the class described adapted for mounting on the instrument panel of an automobile or the like comprising a tuning head, an adapter ring carried thereby, offset portions on said adapter ring engageable against the inner surface of said panel, an escutcheon plate positioned against the outer surface of said panel, and means in the head for indicating the position of a radio receiver tuning condenser, said escutcheon plate being apertured to render visible said indicating means.

2. In a device of the class described, a mounting member comprising a substantially circular ring having apertured portions offset from the plane of the main portion of the ring, one of said offset portions extending within the periphery of the ring and the other of said offset portions extending beyond the said periphery.

3. A device of the class described adapted for mounting on the instrument panel of an automobile or the like comprising a tuning head, an adapter ring carried thereby, offset portions on said adapter ring engageable against the inner surface of said panel, an escutcheon plate positioned against the outer surface of said panel, means in the head for indicating the position of a radio receiver tuning condenser, and means for illuminating said indicating means from the rear thereof, said escutcheon plate being apertured to render visible said indicating means.

4. A device of the class described adapted for mounting on the instrument panel of an automobile or the like comprising a tuning head, a control knob positioned within the periphery of the tuning head, a tuning condenser driving connection operable by said control knob, means for indicating the position of the movable plates of said condenser, said means also being operable by said control knob, an adapter ring carried by the tuning head, offset portions on said ring engageable against the inner surface of said panel, an escutcheon plate positioned against the outer surface of said panel, said plate being apertured to render visible said indicating means and also apertured for the protrusion of the mentioned knob, and means for locking together the adapter ring, escutcheon plate and panel in the mentioned relation.

5. A device of the class described comprising a tuning head having a peripheral flange, control knobs mounted within the periphery of said head and upon a common axis, means for supporting said head on the instrument panel of an automobile or the like, said means comprising a clamp ring having threaded engagement with a peripheral portion of the head, and a member clamped between the mentioned flange and the clamp ring and secured to said panel.

6. A device of the class described comprising a tuning head having a peripheral flange, control knobs mounted within the periphery of said head and upon a common axis, means for supporting said head on the instrument panel of an automobile or the like, said means comprising a clamp ring having threaded engagement with a peripheral portion of the head, an adapter member clamped between the mentioned flange and clamp ring, and means on said adapter member adapted to be secured to the mentioned panel.

7. In combination, a radio tuning head having a peripheral flange, a peripheral clamp ring in threaded engagement with said head, a member clamped between the flange and the clamp ring and having contact with one surface of a mounting panel, a plate member having contact with the other surface of said panel, and means for securing said clamped member and said plate member to said panel and thereby supporting said tuning head on said panel.

8. In combination with a radio receiver tuning head, means for controlling said receiver, a member carried by said head and adapted for mounting on a panel, said member being apertured within and adjacent its periphery, and having an apertured lug extending beyond the periphery of said member, at least one of said apertures being adapted for the passage of said control means.

9. In combination with a radio receiver tuning head having dial means, means for controlling said receiver, a member carried by said head and adapted for mounting on a panel, said member having a substantially central opening to render visible said dial means and also apertured within and adjacent its periphery, said member having an apertured lug extending beyond the periphery thereof, at least one of said apertures being adapted for the passage of said control means.

10. In combination, a radio receiver tuning head, means for controlling a radio receiver, a member secured to said head and having portions extending beyond the periphery thereof, said member having two apertures, one of said apertures being disposed within the periphery of the tuning head and the other of said apertures being disposed beyond said periphery, one of said apertures being adapted for the passage of said control means.

11. In combination, a radio receiver tuning head having dial means, means for controlling a radio receiver, a member secured to said head and having portions extending beyond the periphery thereof, said member having an opening to render visible said dial means, said member also having two apertures, one of said apertures being disposed within the periphery of the tuning head and the other of said apertures being disposed beyond said periphery, one of said apertures being adapted for the passage of said control means.

NATHAN A. KARLIN.